June 30, 1931.　　　　O. R. MILLER　　　　1,811,858
CONTROL SYSTEM FOR TRANSMISSION OF SIGNALS
Filed April 30, 1929　　　2 Sheets-Sheet 1

INVENTOR
O. R. MILLER
BY
ATTORNEY

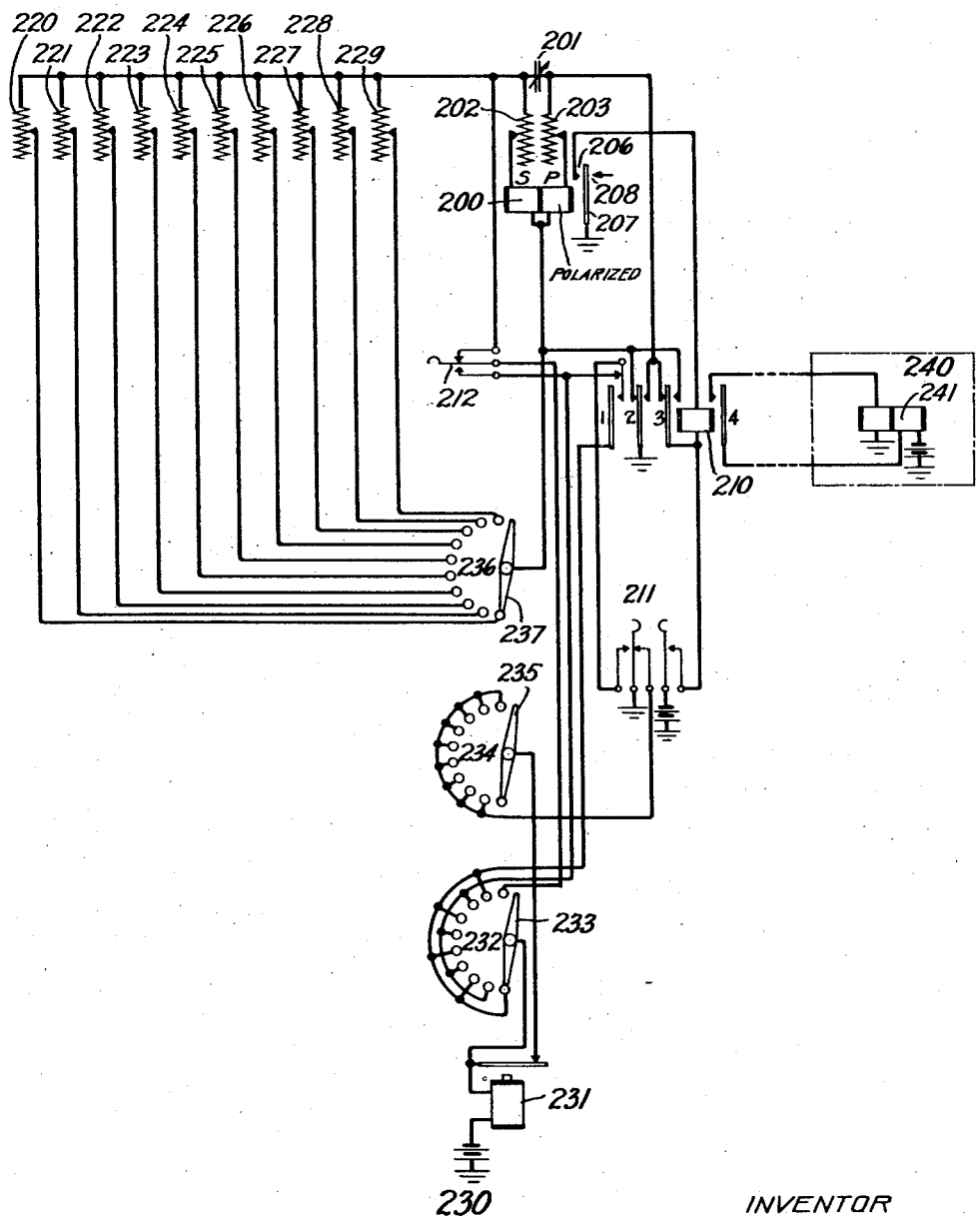

Patented June 30, 1931

1,811,858

UNITED STATES PATENT OFFICE

OHMER R. MILLER, OF FLORAL PARK, NEW YORK, ASSIGNOR TO BELL TELEPHONE LABORATORIES, INCORPORATED, OF NEW YORK, N. Y., A CORPORATION OF NEW YORK

CONTROL SYSTEM FOR TRANSMISSION OF SIGNALS

Application filed April 30, 1929. Serial No. 359,365.

This invention relates to a system of producing and controlling the frequency of electrical impulses.

The object of this invention is to provide in a circuit combination an arrangement of electromagnets for producing series of impulses, the impulses of said series and the open periods between impulses being accurately timed.

One embodiment of the present invention comprises an arrangement of electromagnets for transmitting impulses, operable when battery and ground is connected therewith. The controlling electromagnet has two windings, a circuit being established simultaneously in said two windings for producing magnetizing forces in opposite directions. A circuit having a constant current flow through one winding establishes a magnetizing force for energizing the electromagnet and a circuit through the alternate winding establishes a temporary magnetizing force in the opposite direction to, and greater than that in the main winding. The latter circuit includes a variable condenser which controls the current flow according to its capacity. The current flow diminishes as the condenser becomes charged and, therefore, the opposing magnetizing force diminishes until the magnetizing force in the main winding becomes greater than that in the alternate winding. At a particular time in this interchange of controlling magnetizing forces, the electromagnet attracts its armature. A circuit is thus established for a second electromagnet which transmits an impulse and reverses the direction of current flow through each of the windings of the controlling electromagnet. Variable resistances are used in the circuit of the controlling electromagnet for changing the characteristic of the circuits.

Adjustable shunts are provided for altering the duration of current flow in the condenser circuit for shortening or lengthening the time of energizing the two winding electromagnet. These shunts are connected with the foregoing condenser circuit by movable contacts. Various shunts are used for the operations of the two winding electromagnet in order to separately and variably control the length of the impulses and the open periods between impulses.

Figure 1:
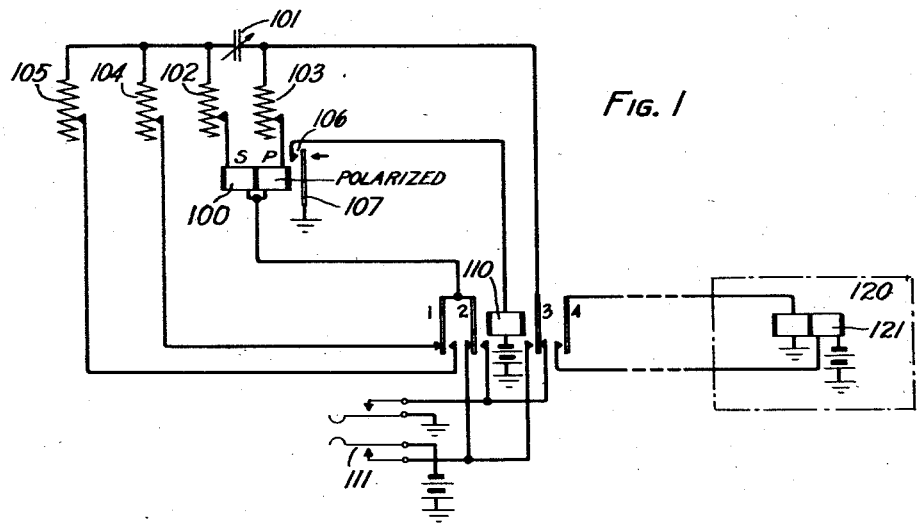
Figure 3:
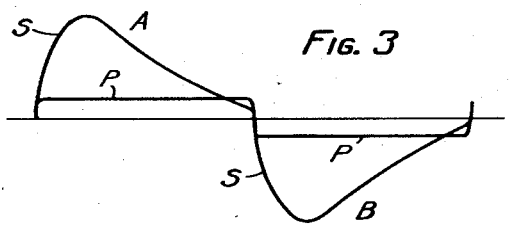
Figure 4:
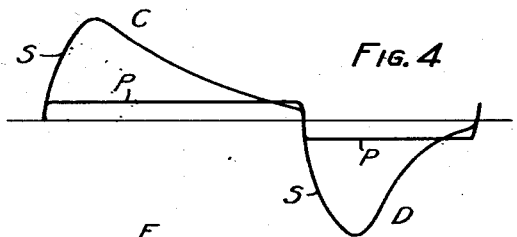
Figure 5:
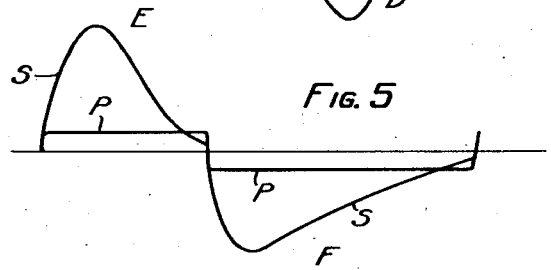

Fig. 1 illustrates the impulsing apparatus combination using two variable shunts which are applied by the contacts of a relay. Fig. 2 illustrates an impulsing apparatus combination using a large plurality of variable shunts applied by the movable contacts of a step-by-step switch. Figs. 3, 4 and 5 are current and magnetization curves to illustrate the action of the two circuits simultaneously established through the windings of the control relay.

The operation of key 111 or other well known automatically operable apparatus may be used for connecting battery and ground to the apparatus of the interrupter circuit shown in Fig. 1. Battery may be traced from the lower contact of key 111, through normal contact 2 of relay 110 to the primary and secondary windings of polarized relay 100. Ground may be traced from the upper contact of key 111, through normal contact 3 of relay 110 to the variable condenser 101 and the variable resistance 103. A circuit having a constant flow of current is thus established for the primary winding P of relay 100 and a circuit of variable current flow is established for the secondary winding S of this relay which circuit includes condenser 101. The windings of relay 100 are arranged to oppose each other when the foregoing circuits are established and are so constructed that the intensity of magnetization in the secondary winding is considerably greater than the intensity of magnetization in the primary winding. As the condenser 101 becomes charged the current flow in the secondary circuit is gradually reduced until the intensity of magnetization becomes greater in the primary winding than in the secondary winding. The magnetization force, therefore, becomes of the proper polarity and intensity to attract the armature 107 for establishing contact 106.

Relay 110 is operated in a circuit established through contact 106 which attracts its armatures. Contact 4 of relay 110 is used for transmitting an impulse for operating electromagnet 121. Contacts 2 and 3 of relay 110 reverse the direction of current flow through the windings of relay 100. Contact 1 is used for associating either shunt 104 or 105 in multiple circuit with the secondary winding of relay 100 for altering the operating time of relay 100 as will be described later. The reversal of direction of current flow through the windings of relay 100 causes the relay to be energized in the same manner as previously described. The armature 107 is, however, propelled in the opposite direction which opens the energizing circuit for relay 110 causing its release. The release of relay 110 again reverses the direction of current flow through the windings of relay 100 to again establish contact 106 and operate relay 110 for transmitting a second impulse.

The variable elements of the circuit will now be described assuming relay 100 to be of a given winding structure. It is well known that the duration of current flow in the circuit disclosed is dependent upon the capacity of condenser 101 and the resistance in the circuit. Assuming a given resistance and voltage the duration of current flow may be changed by adjustment of the condenser. With the condenser adjusted for any given capacity the duration of current flow may be altered by the adjustment of variable resistance 104 or variable resistance 105. These shunt resistances may be adjusted so that the potential of condenser 101 is very rapidly brought to the battery potential or adjusted to bring the potential of condenser 101 up to battery potential very slowly. If shunts 104 and 105 are adjusted to be of the same resistance value the armature 107 is held in each position the same length of time since the duration of current flow through the secondary winding is the same after each operation of relay 110. This would cause the impulse transmitted and the open period between impulses to be of the same duration. It is, however, often of great advantage to arrange the impulse and the open period to be of different duration. This may be accomplished by the adjustment of shunt resistances 104 and 105 to regulate both the duration of the impulse and the duration of the open period between impulses. It is apparent that if shunt 104 is adjusted to be of small resistance value in comparison to the resistance value of the secondary winding of relay 100 and resistance 102, the potential of condenser 101 will be quickly brought to the potential of the battery in circuit therewith. Thus the duration of current flow through the secondary winding is shortened which brings about an earlier effectiveness of the magnetization in the primary winding for attracting armature 107. An adjustment of shunt 104 to a large resistance will likewise lengthen the duration of current flow through the secondary winding of relay 100. Relay 100 has a natural period of operation dependent upon the capacity of condenser 101 and the shunts 104 and 105 are used only to alter this natural period for controlling the duration of the impulse and the open period between impulses. The variable resistances 102 and 103 may be used to vary the characteristic of relay 100.

Curves showing a comparison of magnetizing force in the primary and secondary windings have been shown in Figs. 3, 4 and 5 to represent equal operations of the armature and unequal operations. These curves indicate the duration of current flow and the resultant intensity of magnetization. In Fig. 3 the current flow through the primary winding and the magnetizing force is shown to be constant. The current through the secondary winding is shown to build up a far greater magnetizing force than that in the primary winding. The current through the secondary winding quickly reaches its maximum flow into the condenser 101 and then slowly becomes of lesser value which reduces the magnetizing force below the magnetizing force in the primary winding. When the magnetizing force in the secondary winding has been sufficiently reduced the armature 107 is attracted by the force of magnetism in the primary winding. A circuit for relay 110 is then established as previously described to reverse the direction of current flow through both the primary and secondary windings.

The action of the current in one direction through the primary and secondary windings of relay 100 is the same as the current in the opposite direction if shunts 104 and 105 are adjusted to be of the same resistance value. This is shown by the curve B which indicates magnetizing forces the same as curve A. Fig. 4 illustrates a curve showing the action of relay 100 with shunt 104 adjusted the same as for the operation shown in Fig. 3 and shunt 105 adjusted for a rapid operation of relay 100 when the direction of current through the windings of relay 100 is reversed. Fig. 5 illustrates the opposite condition of shunt values having shunt 104 adjusted for a rapid operation of relay 100 with relay 110 in its normal position and shunt 105 adjusted for a slow operation of relay 100 with relay 110 operated.

The operation of the circuit arrangement shown in Fig. 2 differs from Fig. 1 only in the actuation of a step-by-step switch for selecting a plurality of variable shunts for controlling the time required for energizing relay 200 for positioning its armature in either direction. Relays 200 and 210 are of the same structure and operate in the same manner as relays 100 and 110 of Fig. 1.

Key 211 is actuated to establish circuits for the operation of the apparatus shown in this figure. The original circuit for the primary winding P of relay 200 is established from battery through the right contact of key 211, normal contact 3 of relay 210, resistance 203 winding P of relay 200 to ground through normal contact 2 of relay 210. The original circuit for the secondary windings of relay 200 is established from ground through normal contact 2 of relay 210, left winding of relay 200, resistance 202 and condenser 201. Battery is associated with the opposite plate of condenser 201 over the circuit traced for the primary winding of relay 200. During the first energization of relay 200, shunt 220 is connected around the secondary winding of relay 200 which circuit may be traced from the connection between condenser 201 and resistance 202 through shunt 220, brush 237 and its associated normal contact and to the lower terminal of the secondary winding of relay 200. Shunt 220 is used for the first and second operation of relay 200 and it is arranged for timing the second operation. No pulse is sent until after the first operation of relay 200. For this reason the shunt is used for this first operation for circuit convenience only. When relay 200 attracts its armature 207, closing contact 206, an obvious circuit is established for relay 210 to battery through the right contact of key 211. Upon the operation of relay 210 the direction of current flow is reversed through the windings of relay 200 by contacts 2 and 3. An impulse, tone or any type of signal may be transmitted through contact 4. At this time a circuit is established for the energization of stepping magnet 231 from ground through the left contact of key 211, contact 1 of relay 210, brush 233 and associated contacts which are strapped together, winding of stepping magnet 231 to battery. Switch 230 is of the type that steps the brush members when the magnet is deenergized. Therefore the brushes remain positioned until relay 210 is released. Thereafter the switch magnet is released and reoperated and the brushes are advanced one position upon each operation of release of relay 210.

Each terminal of bank 236 has associated therewith a variable shunt which may be adjusted to control a specific operation of relay 200. The operating time of relay 200 may thus be controlled so that in a series of such operations, impulses of equal duration or of unequal duration may be transmitted. Similarly, the open periods between impulses of a series may be regulated to be of short or long duration. Upon the completion of a switch cycle either a second cycle of impulses may be transmitted or relay 200 may be locked to arrest the transmission of impulses. The position of key 212 controls this choice. In its operated position, a circuit is established for the stepping magnet 231 which extends through brush 233 and its associated contact alternate contact of key 212 to ground through contact 1 of relay 210 and the left contact of key 211. In this position of the switch, relay 200 is operated under the control of shunt 229 in the direction to close contact 206 and operate relay 210 which advances the brush assembly of the switch to its original starting position. On this second series of impulses the shunt 220 is used only for regulating the duration of the first impulse. If key 212 is in its normal position, a holding circuit is established for relay 200 which may be traced from battery through the winding of stepping magnet 231, brush 233 and its associated tenth contact key 212, in its normal position, resistance 202, secondary winding of relay 200, to ground through normal contact 3 of relay 210. Armature 207 is thus held against contact 208 and relay 210 remains unoperated. If it is desired at any time to restore switch 230 to normal, key 211 may be restored, which establishes a circuit for the stepping magnet 231 through its self-interrupting contact and brush 235 to ground through the associated contacts and key 211. The brushes are thus stepped until the normal position 1 is reached, where the circuit through the self-interrupting contact is opened and the switch brushes come to rest.

By the use of a plurality of shunt circuits a series of impulses of different duration may be transmitted or a series of impulses of equal duration may be transmitted. The duration of the impulse and the duration of the open period may be changed at any time by an adjustment of any of the shunt resistances, which as previously explained shortens or lengthens the time required for charging condenser 201, which consequently changes the duration of current flow through the secondary winding of relay 200.

A stepping switch 230 has been shown as the device for progressively associating different shunts with the secondary winding. Any type of switching means may be used for this purpose, such as one relay shown in Fig. 1 or a plurality of relays to replace switch 230.

It is not the intention that the invention be limited to the transmission of direct current signaling impulses.

What is claimed is:

1. A circuit arrangement for controlling the time of operatively energizing an electromagnetic device having only two windings, a circuit through one of said windings having a constant current flow for magnetizing said device, an adjustable condenser, a second circuit including the second of said windings and said condenser for producing a magnetizing force of opposite polarity and of greater intensity than produced in said first winding, which intensity diminishes in a period of time dependent upon the capacity of the condenser to permit the energization of said device.

2. A circuit arrangement for controlling the time of operatively energizing a polarized electromagnet having an armature attractable in either direction and a primary and a secondary winding simultaneously energized with opposing magnetizing forces comprising a condenser in series with said secondary winding for limiting the duration of the opposing magnetizing force in said winding, variable shunts for said secondary winding for altering the duration of said magnetizing force, and means for reversing the polarity of said magnetizing forces to operate said armature in either direction and for selecting a shunt particularly adjusted for a particular operation of said armature.

3. A circuit arrangement for controlling the time of operatively energizing a polarized electromagnet having a primary and a secondary winding and an armature movable in two directions, a circuit through said primary winding having a constant current flow, a condenser, a second circuit including said secondary winding and said condenser arranged to oppose the magnetizing action of the circuit through said primary winding, variable shunts for said secondary winding for altering the duration of current flow in said secondary circuit, and means responsive to the movement of said armature for applying shunts of particular characteristics for maintaining said armature in the position taken for a particular duration.

4. A system for transmitting impulses and for regulating the duration of each impulse and the open period between impulses comprising a polarized electromagnet having a primary and a secondary winding arranged to oppose each other when both are energized, an armature for said electromagnet, means to establish current flow in either direction through said windings for operating said armature in either direction, a condenser in series circuit with said secondary winding for limiting the duration of current flow through said winding and variable shunts for said secondary winding for altering the duration of current flow through said secondary winding for separately controlling the duration of the impulses and the open period between impulses.

5. A system for transmitting impulses and for regulating the duration of each impulse and the open period between impulses comprising a polarized electromagnet having a primary and a secondary winding arranged to oppose each other when both are energized, an armature for said electromagnet, means to establish current flow in either direction through said windings for operating said armature in either direction, a variable condenser in series circuit with said secondary winding for variably limiting the duration of current flow through said windings and variable shunts for said secondary winding for altering the duration of current flow through said secondary winding for separately controlling the duration of the impulses and the open periods between impulses.

6. A system for transmitting impulses and for regulating the duration of each impulse and the open period between impulses comprising a polarized electromagnet having a primary and a secondary winding arranged to oppose each other when both are energized, an armature for said electromagnet, a condenser in series circuit with said secondary winding for limiting the duration of current flow through said winding, variable shunts for said secondary winding for altering the duration of current flow through said secondary winding for separately controlling the duration of impulses and the open period between impulses, and a second electromagnet operable in response to the movement of said armature in one direction and released by the movement of said armature in the opposite direction for transmitting said impulses for controlling the direction of current flow through said primary and secondary windings to operate said armature in either direction and for selecting the proper shunt for association with said secondary winding for each operation of said armature.

7. In a system for transmitting impulses, a two-winding polarized electromagnet, a circuit including one winding of said electromagnet having a constant current flow, a condenser, a second circuit including the second of said windings and said condenser for opposing the magnetism created in said electromagnet by said first circuit, a variable shunt circuit for regulating one operating time of said electromagnet, and a separate variable shunt circuit for regulating the time of operating said electromagnet in the reverse direction, means for controlling the direction of current flow in the circuits through said windings and for associating a particular shunt circuit with said second circuit according to the desired operation of the electromagnet, and means for adjusting said shunt circuits.

8. In a system for transmitting impulses, a two-winding polarized electromagnet, an armature for said electromagnet movable in one direction for causing a pulse to be transmitted and in the opposite direction for causing an open period between impulses, a circuit including one winding having a constant current flow for energizing said electromagnet, a condenser, a second circuit including the second of said windings and said condenser for opposing the magnetism created in the electromagnet by said first circuit, a variable shunt circuit for regulating the duration of said impulse, a variable shunt circuit for regulating the duration of said open period, means responsive to the positioning of said armature for controlling the direction of current flow through said windings and for associating the proper shunt circuit with said secondary circuit, and means for adjusting said shunt circuits.

9. In an electrical system, an interrupter comprising a first electromagnetic device with two windings and a second electromagnetic device, a circuit through one winding of said first device having a constant current flow for magnetizing said device, a variable condenser, a second circuit through the second winding of said first device and said condenser for creating a magnetizing force of opposite polarity and of greater intensity than created in said first winding, which intensity diminishes as the condenser becomes charged, to permit the operation of said device within a period of time dependent upon the capacity of said condenser, means dependent upon one operation of said device for operating said second device, and means dependent upon said second device for operating said first device in the reverse direction.

10. A device for producing and controlling the frequency of interruptions in an electrical circuit comprising a polarized electromagnet having two windings, an energizing circuit for said electromagnet through one of said windings, a circuit for retarding the operative energization of said magnet including a second of said windings and a variable capacity, means for adjusting said capacity for controlling the time of operating said electromagnet, a second electromagnet, means controlled by said first electromagnet for operating said second electromagnet for operating said first electromagnet in the reverse direction by reversing the direction of current flow in each winding of said first electromagnet and for interrupting an electrical circuit, and means for adjusting said capacity for controlling the operating time of said first electromagnet.

11. A circuit arrangement for controlling the time of operatively energizing an electromagnet having a primary and a secondary winding comprising a condenser in series circuit with said secondary winding and a plurality of selectable shunts for said secondary winding for variably controlling the time of energizing said electromagnet and switching means for automatically selecting said various shunts.

12. A circuit arrangement for transmitting a series of impulses of different duration comprising an electromagnet having an armature operable in two directions for controlling the transmission of impulses, a plurality of variable selectable shunt circuits for said electromagnet for controlling the duration of any of the impulses of a series and means for successively selecting said shunt circuits.

13. A circuit arrangement for transmitting a series of impulses of different duration comprising an electromagnet having an armature operable in two directions and a condenser in series with one of its windings for regulating the speed of operating said electromagnet and a plurality of variable selectable shunt circuits for varying said regulation to variably control the holding of said armature in either position and consequently control the duration of any of the impulses of a series and the duration of any of the open periods between said impulses.

14. A circuit arrangement for controlling the time of operatively energizing a polarized electromagnet having an armature attractable in either direction and a primary and a secondary winding simultaneously energized for creating opposing magnetizing forces comprising a condenser in series with said secondary winding for limiting the duration of the opposing magnetizing forces created by said winding, variable resistances for said windings for altering the character of said magnetizing forces, and means for reversing the polarity of said magnetizing forces to operate said armature in either direction and for selecting a resistance particularly adjusted for a particular operation of said armature.

In witness whereof, I hereunto subscribe my name this 29th day of April, 1929.

OHMER R. MILLER.